(12) United States Patent
Zhang et al.

(10) Patent No.: US 10,745,007 B2
(45) Date of Patent: Aug. 18, 2020

(54) COLLISION AVOIDANCE SYSTEMS AND METHODS

(71) Applicant: DENSO International America, Inc., Southfield, MI (US)

(72) Inventors: Yu Zhang, Farmington Hills, MI (US); Doua Vang, Waterford, MI (US); Bilal Alasry, Dearborn, MI (US)

(73) Assignee: DENSO International America, Inc., Southfield, MI (US)

( * ) Notice: Subject to any disclaimer, the term of this patent is extended or adjusted under 35 U.S.C. 154(b) by 74 days.

(21) Appl. No.: 16/003,795

(22) Filed: Jun. 8, 2018

(65) Prior Publication Data

US 2019/0375400 A1 Dec. 12, 2019

(51) Int. Cl.
*B60W 30/09* (2012.01)
*B60W 30/17* (2020.01)
*B60W 50/14* (2020.01)

(52) U.S. Cl.
CPC ............ *B60W 30/09* (2013.01); *B60W 30/17* (2013.01); *B60W 50/14* (2013.01); *B60W 2050/143* (2013.01); *B60W 2554/80* (2020.02); *B60W 2720/10* (2013.01); *B60W 2720/24* (2013.01)

(58) Field of Classification Search
CPC ...... B60W 30/09; B60W 50/14; B60W 30/17; B60W 2550/30; B60W 2720/10; B60W 2720/24; B60W 2050/143
USPC .......................................................... 701/96
See application file for complete search history.

(56) References Cited

U.S. PATENT DOCUMENTS

| 8,423,250 | B2 * | 4/2013 | Kondou | B60W 10/18 |
| | | | | 701/53 |
| 9,771,070 | B2 * | 9/2017 | Zagorski | B60W 30/09 |
| 9,881,498 | B2 * | 1/2018 | Paromtchik | G08G 1/0137 |
| 9,969,388 | B2 * | 5/2018 | Schmudderich | B60W 30/09 |
| 10,059,335 | B2 * | 8/2018 | Newman | B60W 50/16 |
| 10,081,357 | B2 * | 9/2018 | Saigusa | G08G 1/096791 |
| 10,137,894 | B2 * | 11/2018 | Nakadori | B60W 30/17 |
| 10,198,001 | B2 * | 2/2019 | Shashua | G01C 21/32 |
| 10,358,132 | B2 * | 7/2019 | Hyun | B60W 30/162 |
| 10,384,681 | B2 * | 8/2019 | Masui | G08G 1/167 |

(Continued)

FOREIGN PATENT DOCUMENTS

| JP | 2004173195 A | 6/2004 |
| JP | 2008257350 A | 10/2008 |

*Primary Examiner* — Angelina Shudy
*Assistant Examiner* — Mohamed Abdo Algehaim
(74) *Attorney, Agent, or Firm* — Harness, Dickey & Pierce, P.L.C.

(57) ABSTRACT

A collision avoidance system for a subject vehicle. The system includes a secondary vehicle detection module that, based on at least one of inputs from sensors of the subject vehicle or a message transmitted by a secondary vehicle, detects the following: location, speed, and heading of the secondary vehicle, and whether the secondary vehicle intends to turn or change lanes. A warning module warns an operator of the subject vehicle of the secondary vehicle and the identified intention of the secondary vehicle, and modifies warning intensity based on the detected intention of the secondary vehicle to turn or change lanes. An adaptive cruise control module modifies at least one of speed and heading of the subject vehicle based on the detected intention of the secondary vehicle to turn or change lanes.

13 Claims, 4 Drawing Sheets

(56) References Cited

U.S. PATENT DOCUMENTS

| | | | |
|---|---|---|---|
| 10,549,762 B2* | 2/2020 | Naserian | B60W 10/20 |
| 2003/0135317 A1* | 7/2003 | Hijikata | B60K 26/021 |
| | | | 701/70 |
| 2008/0272898 A1* | 11/2008 | Irion | B60Q 9/008 |
| | | | 340/436 |
| 2009/0037070 A1* | 2/2009 | Nakamura | B60W 30/16 |
| | | | 701/96 |
| 2009/0228184 A1* | 9/2009 | Ueyama | B60W 30/095 |
| | | | 701/96 |
| 2010/0198478 A1* | 8/2010 | Shin | B60W 10/06 |
| | | | 701/96 |
| 2011/0153178 A1* | 6/2011 | Westendorf | B60W 30/16 |
| | | | 701/96 |
| 2012/0053808 A1* | 3/2012 | Arai | B60W 10/06 |
| | | | 701/96 |
| 2012/0166058 A1* | 6/2012 | Armbrust | B60Q 1/525 |
| | | | 701/96 |
| 2012/0239253 A1* | 9/2012 | Schmidt | B60T 7/22 |
| | | | 701/41 |
| 2013/0085976 A1* | 4/2013 | Bone | B60W 30/18163 |
| | | | 706/46 |
| 2013/0268174 A1* | 10/2013 | Koshizen | B60W 30/16 |
| | | | 701/96 |
| 2014/0005906 A1* | 1/2014 | Pandita | B60W 30/16 |
| | | | 701/96 |
| 2014/0005908 A1* | 1/2014 | Kollberg | B60W 10/06 |
| | | | 701/96 |
| 2014/0195093 A1* | 7/2014 | Litkouhi | B62D 15/0255 |
| | | | 701/23 |
| 2015/0149059 A1* | 5/2015 | Choi | B60W 30/146 |
| | | | 701/96 |
| 2015/0194055 A1* | 7/2015 | Maass | B60W 50/14 |
| | | | 340/905 |
| 2015/0232090 A1* | 8/2015 | Jeon | B60T 7/12 |
| | | | 701/41 |
| 2015/0321699 A1* | 11/2015 | Rebhan | B60O 9/00 |
| | | | 701/23 |
| 2015/0353087 A1* | 12/2015 | Niino | B60W 30/16 |
| | | | 701/96 |
| 2016/0082971 A1* | 3/2016 | Fuehrer | B60W 10/20 |
| | | | 701/48 |
| 2016/0293010 A1* | 10/2016 | Kamijo | G08G 1/166 |
| 2017/0232970 A1* | 8/2017 | Schaper | B60W 30/18163 |
| | | | 701/36 |
| 2017/0341652 A1* | 11/2017 | Sugawara | B60W 50/14 |
| 2018/0015827 A1* | 1/2018 | Takano | B60T 7/042 |
| 2018/0061240 A1* | 3/2018 | Lee | G08G 1/167 |
| 2018/0105171 A1* | 4/2018 | Tsuji | B60W 30/146 |
| 2018/0178787 A1* | 6/2018 | Gutmann | B60W 30/08 |
| 2018/0281791 A1* | 10/2018 | Fukaya | B60W 30/16 |
| 2019/0004529 A1* | 1/2019 | Im | B60W 30/00 |
| 2019/0039626 A1* | 2/2019 | Hatano | B60W 50/10 |
| 2019/0071075 A1* | 3/2019 | Mimura | B60R 21/00 |
| 2019/0283751 A1* | 9/2019 | Ueda | B60W 30/16 |
| 2019/0286160 A1* | 9/2019 | Toda | G05D 1/0289 |
| 2019/0351906 A1* | 11/2019 | Oh | B60W 30/16 |

\* cited by examiner

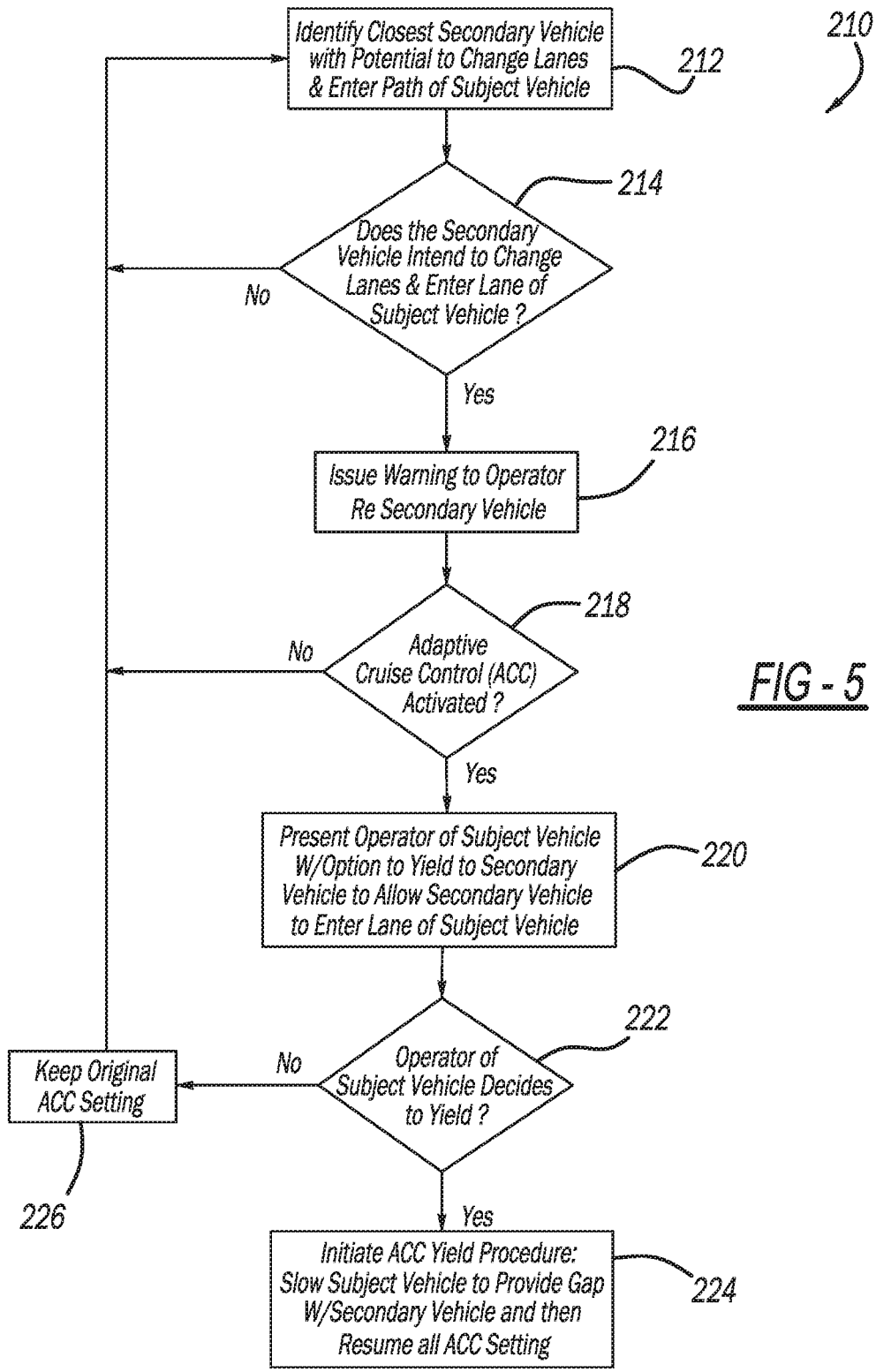

COLLISION AVOIDANCE SYSTEMS AND METHODS

FIELD

The present disclosure relates to systems and methods for avoiding collisions between two vehicles.

BACKGROUND

This section provides background information related to the present disclosure, which is not necessarily prior art.

Vehicles are becoming safer and more user-friendly as a result of features such as lane positioning and collision warning systems. With all the extra safety features added to vehicles, however, some of these safety systems generate unwanted warnings if unable to integrate with other sources of information. With respect to current collision warning systems, for example, the only data considered is the approaching speed of the vehicle. In some instances, this will generate an unwanted brake warning even though a lead vehicle has a clear intention and opportunity to make a turn/lane change. Furthermore, current collision warning systems may fail to account for another vehicle entering the driving path of the subject vehicle. Although current collision avoidance and warning systems are suitable for their intended use, they are thus subject for improvement. The present disclosure addresses these issues in the art, as well as numerous others as described in detail herein and as one skilled in the art will appreciate.

SUMMARY

This section provides a general summary of the disclosure, and is not a comprehensive disclosure of its full scope or all of its features.

The present disclosure includes a collision avoidance system for a subject vehicle. The system includes a secondary vehicle detection module that, based on at least one of inputs from sensors of the subject vehicle or a message transmitted by a secondary vehicle, detects the following: location, speed, and heading of the secondary vehicle, and whether the secondary vehicle intends to turn or change lanes. A warning module warns an operator of the subject vehicle of the secondary vehicle and the identified intention of the secondary vehicle, and modifies warning intensity based on the detected intention of the secondary vehicle to turn or change lanes. An adaptive cruise control module modifies at least one of speed and heading of the subject vehicle based on the detected intention of the secondary vehicle to turn or change lanes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 5 illustrates another method in accordance with the present disclosure for avoiding a collision.

Corresponding reference numerals indicate corresponding parts throughout the several views of the drawings.

DETAILED DESCRIPTION

Example embodiments will now be described more fully with reference to the accompanying drawings.

Figure 1:
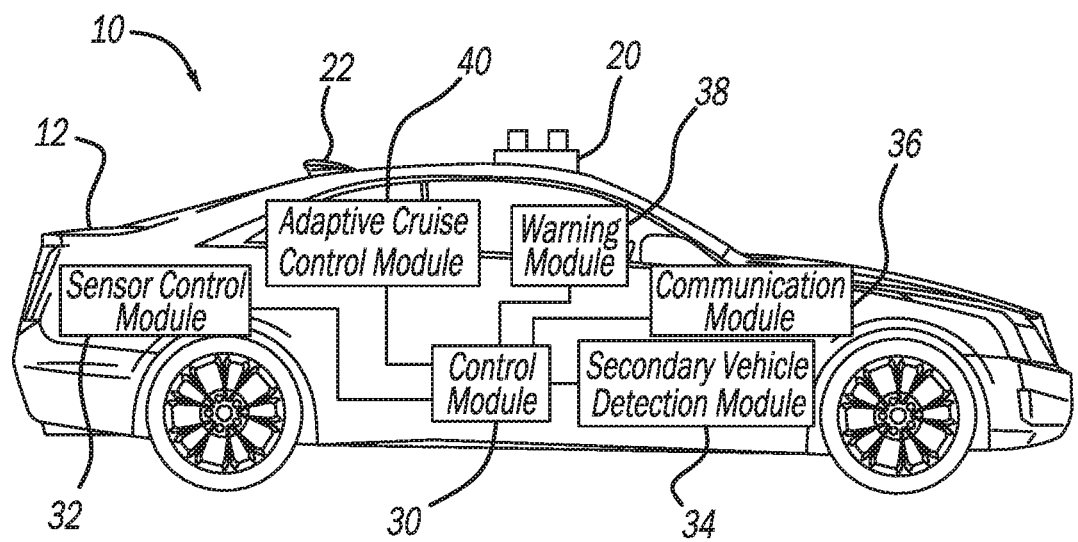
FIG. 1 illustrates a collision avoidance system in accordance with the present disclosure installed in an exemplary subject vehicle.

FIG. 1 illustrates a collision avoidance system 10 in accordance with the present disclosure. The system 10 is installed in an exemplary subject vehicle 12. Although the subject vehicle 12 is illustrated as a passenger vehicle, the collision avoidance system 10 may be installed in any other suitable vehicle as well, such as any suitable mass transit vehicle, recreational vehicle, commercial vehicle, military vehicle/equipment, construction equipment, motorcycle, watercraft, aircraft, etc.

The collision avoidance system 10 includes a plurality of sensors 20. The sensors 20 may be any sensors suitable for identifying a secondary vehicle (such as the secondary vehicle 14 of FIGS. 2 and 4), and identifying various operational parameters thereof. For example, the sensors 20 are suitable to identify at least the location, speed, heading, and activation of turn signals 16. Suitable exemplary sensors 20 include cameras (e.g., infrared, visible light, etc.), radar, LIDAR, sonar, etc. The sensors 20 may also be configured to detect pedestrians and any other objects that may present a collision threat to the subject vehicle 12.

The system 10 further includes an antenna 22, which may be mounted to the subject vehicle 12 to receive messages either directly or indirectly from the secondary vehicle 14 including operational parameters of the secondary vehicle 14. Exemplary operational parameters include, but are not limited to, one or more of the following: location, speed, heading, turn signal activation, intended route, etc. The message may be a basic safety message (BSM), for example, indicating that the turn signals 16 of the secondary vehicle 14 have been activated, and thus the operator of the secondary vehicle 14 intends to make a turn.

The system 10 further includes a control module 30, a sensor control module 32, a secondary vehicle detection module 34, a communication module 36, a warning module 38, and an adaptive cruise control module 40. In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The sensor control module 32 controls the sensors 20, and processes the data captured by the sensors 20. The sensor control module 32 inputs the data from the sensors 20 to the various other modules, such as the control module 30 and the secondary vehicle detection module 34. The secondary vehicle detection module 34 detects secondary vehicles, such as the secondary vehicle 14, proximate to the subject vehicle 12 based on the data received from the sensor control module 32.

The secondary vehicle detection module 34 also determines whether the secondary vehicle 14 is likely to turn or change lanes based on data captured by the sensors 20 and received from the sensor control module 32. The secondary vehicle detection module 34 also receives message data from the communication module 36, the message data indicating whether the secondary vehicle 14 intends to turn or change lanes. The communication module 36 receives the messages from the antenna 22.

The warning module 38 controls warning systems of the subject vehicle 12, such as any suitable visual, audible, and/or haptic warning systems. The warning module 38 will issue warnings to the operator of the subject vehicle 12 based on the threat that the secondary vehicle 14 poses to a collision with the subject vehicle 12.

The adaptive cruise control module 40 is in receipt of data from the secondary vehicle detection module 34 regarding at least the location, speed, and heading of the secondary vehicle 14, and whether the secondary vehicle 14 intends to turn or change lanes. Based on the perceived threat of the secondary vehicle 14 to collide with the subject vehicle 12, as determined by the control module 30, the adaptive cruise control module 40 controls at least one of the speed and heading of the subject vehicle 12 to avoid a collision with the secondary vehicle 14. The control module 30 is in receipt of data from the subject vehicle 12 regarding at least the speed and heading of the subject vehicle 12 (and optionally the intended route of the subject vehicle 12). The control module 30 is also in receipt of the operating parameters (and optionally the intended route) of the secondary vehicle 14 from the secondary vehicle detection module 34, such as the speed, heading, and/or turn signal activation notification of the secondary vehicle 14. Based on this data input to the control module 30, the control module 30 calculates a time to collision between the subject vehicle 12 and the secondary vehicle 14. Based on this information input to the control module 30, the control module 30 is further configured to determine the time needed by the secondary vehicle 14 to exit the path of the subject vehicle 12. Additional details of the modules 30-40 are described herein, such as in conjunction with the descriptions of the method 110 of FIG. 3 and the method 210 of FIG. 5.

Figure 2:
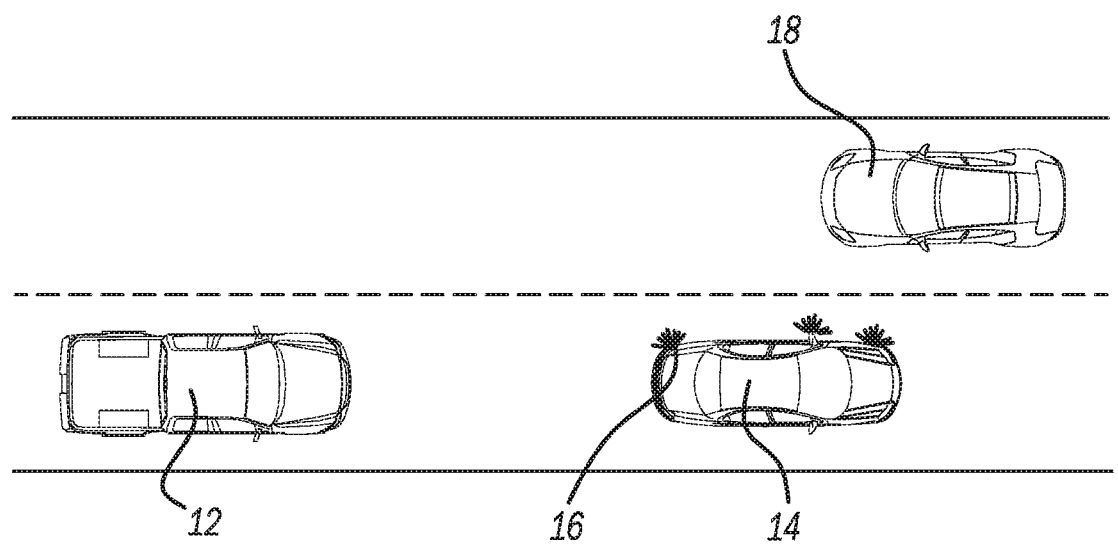
FIG. 2 illustrates an exemplary scenario in which the collision avoidance system is used to detect intention of a secondary vehicle to turn out of the lane of the subject vehicle.
Figure 3:
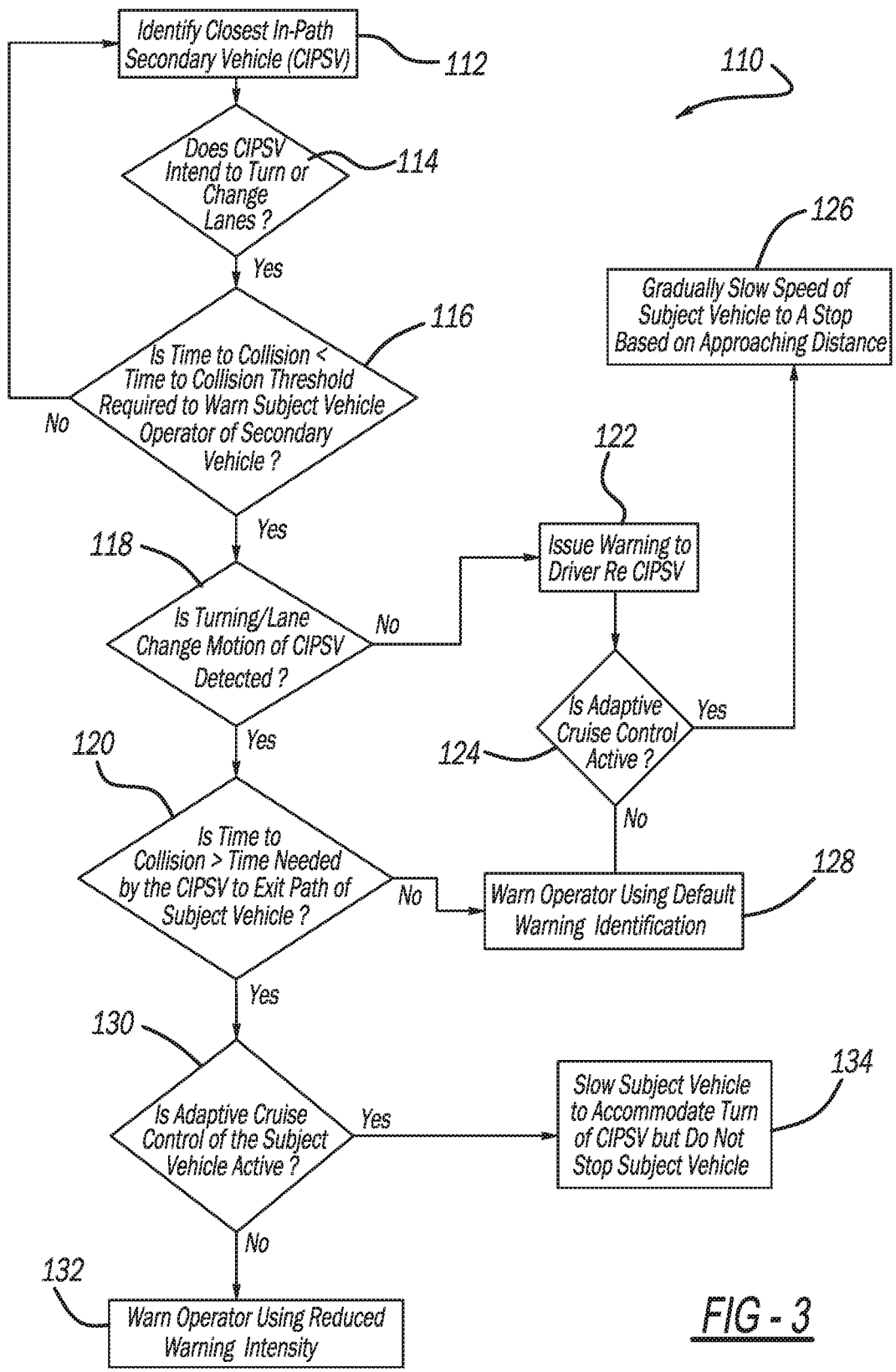
FIG. 3 illustrates an exemplary method for avoiding a collision in accordance with the present disclosure.

With continued reference to FIGS. 1 and 2, and additional reference to FIG. 3, a method 110 in accordance with the present disclosure for avoiding a collision between the subject vehicle 12 and the secondary vehicle 14 will now be described. The method 110 is described as being performed by the collision avoidance system 10, however, the method 110 may be performed by any other suitable system as well. With initial reference to block 112 of the method 110, the closest in-path secondary vehicle (CIPSV) is identified, such as by the secondary vehicle detection module 34 based on data captured by the sensors 20 and/or based on messages (such as basic safety messages) received by the antenna 22 and the communication module 36. In the example of FIG. 2, the CIPSV is the secondary vehicle 14. From block 112, the method 110 proceeds to block 114.

At block 114, the secondary vehicle detection module 34 determines whether the CIPSV intends to turn or change lanes. The secondary vehicle detection module 34 makes this determination based on whether the turn signals 16 are activated, as sensed by the sensors 20 and/or based on information in a message received by the antenna 22 and communication module 36. The determination as to whether the CIPSV 14 intends to change lanes may be further based on the speed and heading of the vehicle 14. The determination as to whether the secondary vehicle 14 intends to change lanes can be made by the secondary vehicle detection module 34. The determination as to whether the secondary vehicle 14 intends to change lanes may be further based route information transmitted from the secondary vehicle 14 and map data.

From block 114 the method 110 proceeds to block 116. At block 116, the control module 30 calculates a time to collision between the subject vehicle 12 and the secondary vehicle 14 based on the location, speed, and heading (and optionally intended route) of the secondary vehicle 14, as well as the speed and heading (and optionally intended route) of the subject vehicle 12. The control module 30 then determines whether the time to collision is greater or less than a time to collision threshold required to warn the operator of the subject vehicle 12 of the secondary vehicle 14. If the time to collision is not less than the time to collision threshold, then the method 110 proceeds to block 112, and blocks 112 and 114 are repeated because the secondary vehicle 14 is sufficiently spaced apart from the subject vehicle 12 such that the operator of the subject vehicle 12 need not yet be concerned with a collision with the secondary vehicle 14. If the time to collision is less than the time to collision threshold, then the method 110 proceeds to block 118.

At block 118, the secondary vehicle detection module 34 determines whether the secondary vehicle 14 is in motion to turn or change lanes based on data received from the sensors 20 and/or a message received by the antenna 22 and the communication module 36 indicating the speed and heading of the secondary vehicle 14. If turning and/or lane change motion of the secondary vehicle 14 is detected at block 118, then the method 110 proceeds to block 120. If no turning or lane change motion is detected at block 118, then the method 110 proceeds to block 122.

At block 122, the warning module 38 activates warning systems of the subject vehicle 12 to alert the operator thereof that the secondary vehicle 14 poses a collision danger, and that the secondary vehicle 14 is not exhibiting an intention to turn or change lanes, and thus poses a collision threat. From block 122 the method 110 proceeds to block 124. At block 124 the control module 30 determines whether the adaptive cruise control module 40 is active to pilot the subject vehicle 12. If the adaptive cruise control module 40 is active, the method 110 proceeds to block 126. At block 126, the adaptive cruise control module 40 gradually slows the speed of the subject vehicle 12 to a stop based on distance between the subject vehicle 12 and the secondary vehicle 14. If at block 124 the adaptive cruise control module 40 is not active, the method 110 proceeds to block 128. At block 128, the warning module 38 warns the operator of the subject vehicle 12 with any suitable default warning at a default intensity.

If at block 118 the secondary vehicle detection module 34 determines that the secondary vehicle 14 is in the process of turning or changing lanes, the method 110 proceeds to block 120. At block 120, the control module 30 determines whether the time to collision between the subject vehicle 12 and the secondary vehicle 14 is greater than the time needed by the secondary vehicle 14 to exit the path of the subject vehicle 12. If the time to collision is not greater than the time needed by the secondary vehicle 14 to exit the path of the subject vehicle 12, the method 110 proceeds to block 128. If the time to collision is greater than the time needed by the secondary vehicle 14 to exit the path of the subject vehicle 12 (as calculated by the control module 30), then the method 110 proceeds to block 130.

The time required for the secondary vehicle 14 to exit the path of the subject vehicle 12 will depend on whether there is a third vehicle in the way of the secondary vehicle 14. For example and as illustrated in FIG. 2, the time required for the secondary vehicle 14 to exit the path of the subject vehicle 12 will depend on the time required for a third vehicle 18 traveling in an opposite direction to pass the secondary vehicle 14 to allow the secondary vehicle 14 to turn. The presence of, speed of, and heading of the third vehicle 18 can be detected by the sensors 20 of the subject vehicle 12, and/or included in a V2X message (such as a BSM) transmitted by the third vehicle 18 and received by the antenna 22 and the communication module 36. The secondary vehicle detection module 34 is configured to take into account the speed and heading of the third vehicle 18 when calculating the time required for the secondary vehicle 14 to exit the path of the subject vehicle 12. The secondary vehicle detection module 34 is also configured to take into account the speed and heading of any other vehicle or object, including a pedestrian detected by the sensor 20.

At block 130, the control module 30 determines whether the adaptive cruise control module 40 is active. If the adaptive cruise control module 40 is not active, the method 110 proceeds to block 132. At block 132, the control module 30 instructs the warning module 38 to warn the operator of the subject vehicle 12 of the potential of a collision with the secondary vehicle 14 at a reduced warning intensity, which is less than the default warning intensity of block 128. If at block 130 the adaptive cruise control module 40 is not active, the method 130 proceeds to block 134. At block 134 the control module 30 instructs the adaptive cruise control module 40 to slow the subject vehicle 12 to accommodate the turn of the secondary vehicle 14, without stopping the subject vehicle 12. The method 110 thus advantageously reduces the possibility of a collision between the subject vehicle 12 and the secondary vehicle 14 travelling in the same lane as the subject vehicle 12.

With continued reference to FIG. 1 and additional reference to FIGS. 4 and 5, an additional method 210 in accordance with the present disclosure will now be described. Although the method 210 is described as being performed by the collision avoidance system 10, the method 210 may be performed by any other suitable collision avoidance system as well.

Figure 4:
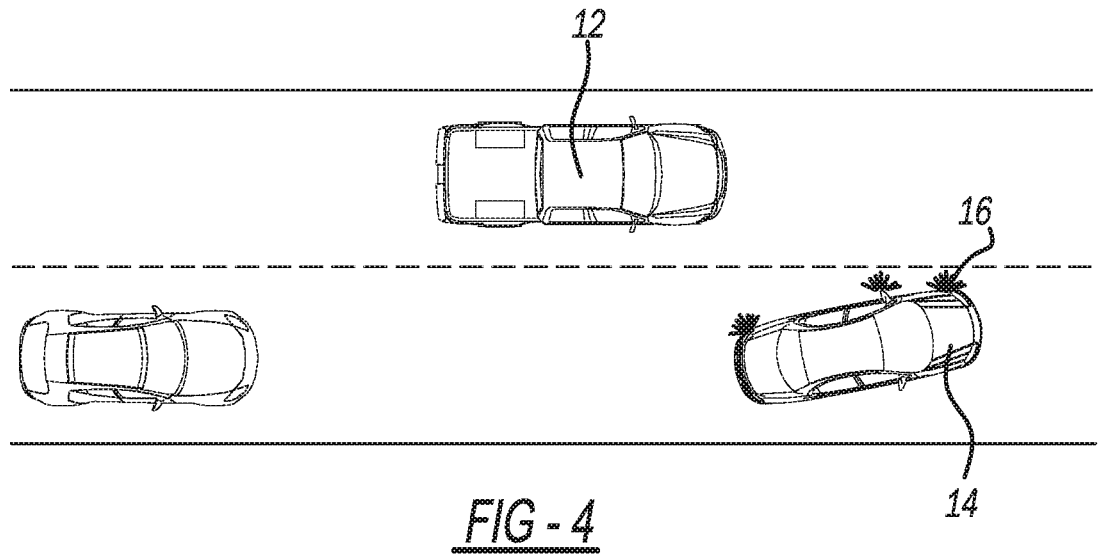
FIG. 4 illustrates an exemplary scenario in which the collision avoidance system according to the present teachings can be used to detect a secondary vehicle merging into the lane of the subject vehicle.

With reference to block 212, the method 210 first identifies the closest secondary vehicle 14 with the potential to change lanes and enter the path of the subject vehicle 12, as illustrated in the example of FIG. 4. The secondary vehicle 14 is detected by the secondary vehicle detection module 34.

From block 212 the method 210 proceeds to block 214. At block 214 the secondary vehicle detection module 34 determines whether the secondary vehicle 14 intends to change lanes to enter the lane of the subject vehicle 12. The intent of the secondary vehicle 14 to enter the lane of the subject vehicle 12 can be determined by the secondary vehicle detection vehicle module 34 based on detection of activated turn signals 16, based on information in a basic safety message received by the antenna 22 and the communication module 36, and/or based on the speed and heading of the secondary vehicle 14.

If at block 214 it is determined that the secondary vehicle 214 does not intend to change lanes and enter the lane of the subject vehicle 12, the method 210 returns to block 212. If at block 214 the secondary vehicle detection module determines that the secondary vehicle 14 intends to change lanes to enter the lane of the subject vehicle 12, the method 210 proceeds to block 216. At block 216, a warning is issued to the operator of the subject vehicle 12 warning the operator of the intention of the secondary vehicle 14 to change lanes and enter the lane of the subject vehicle 12. The warning is issued by the warning module 38, and may be any suitable visual, audible, and/or haptic warning. The warning module 38 may be instructed to issue the warning by the control module 30 in response to the control module 30 being informed by the secondary vehicle detection module 34 that the secondary vehicle 14 intends to change lanes and enter the lane of the subject vehicle 12. From block 216 the method 210 proceeds to block 218.

At block 218, the control module 30 determines whether the adaptive cruise control module 40 is activated. If the adaptive cruise control module 40 is not activated, the method 210 returns to block 212. If the adaptive cruise control module 40 is active, the method 210 proceeds to block 220. At block 220, the adaptive cruise control module 40 presents the operator of the subject vehicle 12 with the option of yielding to the secondary vehicle 14 to allow the secondary vehicle 14 to enter the lane of the subject vehicle 12.

From block 220, the method 210 proceeds to block 222. At block 222, the method 210 proceeds to block 224 if the operator of the subject vehicle 12 chooses to yield to the secondary vehicle 14. At block 224, the adaptive cruise control module 40 initiates a yield procedure, which includes slowing the subject vehicle 12 to provide a gap between the subject vehicle 12 and the secondary vehicle 14 as the secondary vehicle 14 merges into the lane of the subject vehicle 12. After the secondary vehicle 14 has merged, the adaptive cruise control module 40 will resume its standard cruise control operation. If the operator of the subject vehicle 12 decides to not yield to the secondary vehicle 14, the method 210 proceeds from block 222 to block 226. At block 226, the adaptive cruise control module 40 maintains the original cruise control settings, and ultimately returns to block 212.

The present disclosure thus advantageously provides for collision avoidance systems 10 and methods 110, 210 in which the human longitudinal speed control decision is mimicked and the warning distance thresholds and intensities are adjusted based on the turning/lane-changing intention of secondary vehicle 14 in front of, or in neighboring lanes of, subject vehicle 12. The systems and methods of the present disclosure advantageously infer the intention of the secondary vehicle 14 through camera-enabled turn signal detection, camera/radar/LIDAR-based distance detection, as well as vehicle-to-vehicle/infrastructure (V2X) technology, which can transmit turn signal information in a broadcasting package. In this way, the systems and methods of the present disclosure are able to detect or "see" the secondary vehicle 14 turn, change lanes, or merge into the lane of the subject vehicle 12, and may predict an impending turn, particularly when the secondary vehicle detection module 34 is augmented with map data. As a result, "false alarm" warnings of the secondary vehicle 14 being a collision threat to the subject vehicle 12 are reduced or eliminated, particularly when the secondary vehicle 14 intends to turn or change lanes so as to no longer be in the path of the subject vehicle 12. One skilled in the art will appreciate that the present disclosure provides numerous additional advantages and unexpected results in addition to those specifically described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A collision avoidance system for a subject vehicle comprising:
    a secondary vehicle detection module that, based on at least one of inputs from sensors of the subject vehicle or a message transmitted by a secondary vehicle, detects the following: location, speed, and heading of the secondary vehicle, and whether the secondary vehicle intends to turn or change lanes;
    a warning module that warns an operator of the subject vehicle of the secondary vehicle and an identified intention of the secondary vehicle, and modifies warning intensity based on a detected intention of the secondary vehicle to turn or change lanes;
    an adaptive cruise control module that modifies at least one of speed and heading of the subject vehicle based on the detected intention of the secondary vehicle to turn or change lanes; and
    a control module for the subject vehicle that calculates a time to collision between the subject vehicle and the secondary vehicle based on the location, speed, and heading of the secondary vehicle, and a speed and heading of the subject vehicle;
    wherein the control module is configured to determine whether the time to collision between the subject vehicle and the secondary vehicle is greater than or less than a time to collision threshold required to warn the operator of the subject vehicle of the secondary vehicle;
    wherein the secondary vehicle detection module determines that the secondary vehicle intends to turn or change lanes based on detection of an activated turn signal of the secondary vehicle by the sensors, or based on information in the message transmitted by the secondary vehicle;
    wherein the control module is configured to determine how much time the secondary vehicle requires to exit a path of the subject vehicle based on the location, speed, and heading of the secondary vehicle, and based on the location, speed, and heading of the subject vehicle; and wherein the adaptive cruise control module reduces speed of the subject vehicle to accommodate a turn of the secondary vehicle, but maintains the subject vehicle in motion, when the control module of the subject vehicle detects the following:

the time to collision between the subject vehicle and the secondary vehicle is less than the time to collision threshold required to warn the operator of the subject vehicle of the secondary vehicle; and the time to collision between the subject vehicle and the secondary vehicle is greater than the time required by the secondary vehicle to exit the path of the subject vehicle.

2. The system of claim 1, wherein the sensors include at least one of a camera, radar, and LIDAR.

3. The system of claim 1, wherein the control module is configured to determine how much time the secondary vehicle requires to exit a path of the subject vehicle based on the location, speed, and heading of a third vehicle inhibiting movement of the secondary vehicle.

4. The system of claim 1, wherein the adaptive cruise control module reduces speed of the subject vehicle to a stop based on a distance between the subject vehicle and the secondary vehicle when the control module of the subject vehicle detects the following:

the time to collision between the subject vehicle and the secondary vehicle is less than the time to collision threshold required to warn the operator of the subject vehicle of the secondary vehicle; and the secondary vehicle detection module detects no turning or lane change motion of the secondary vehicle.

5. The system of claim 1, wherein the adaptive cruise control module reduces speed of the subject vehicle to a stop based on a distance between the subject vehicle and the secondary vehicle when a control module of the subject vehicle detects the following:

the time to collision between the subject vehicle and the secondary vehicle is less than the time to collision threshold required to warn the operator of the subject vehicle of the secondary vehicle; and the time to collision between the subject vehicle and the secondary vehicle is less than the time the secondary vehicle requires to exit the path of the subject vehicle.

6. The system of claim 1, wherein the warning module issues a first intensity warning to the operator of the subject vehicle when:

the adaptive cruise control module is inactive;

the time to collision between the subject vehicle and the secondary vehicle is less than the time to collision threshold required to warn the operator of the subject vehicle of the secondary vehicle; and the time to collision between the subject vehicle and the secondary vehicle is less than the time the secondary vehicle requires to exit the path of the subject vehicle.

7. The system of 6, wherein the warning module issues a second intensity warning, which is greater than the first intensity warning, to the operator of the subject vehicle when:

the time to collision between the subject vehicle and the secondary vehicle is less than the time to collision threshold required to warn the operator of the subject vehicle of the secondary vehicle; and the secondary vehicle detection module detects no turning or lane change motion of the secondary vehicle.

8. The system of claim 6, wherein the warning module issues a second intensity warning, which is greater than the first intensity warning, to the operator of the subject vehicle when:

the time to collision between the subject vehicle and the secondary vehicle is less than the time to collision threshold required to warn the operator of the subject vehicle of the secondary vehicle; and the time to collision between the subject vehicle and the secondary vehicle is less than the time the secondary vehicle requires to exit the path of the subject vehicle.

9. The system of claim 1, wherein the secondary vehicle detection module determines that the secondary vehicle intends to change lanes to move into a lane that the subject vehicle is traveling in based on detection of an activated turn signal of the secondary vehicle by the sensors, or based on information in the message transmitted by the secondary vehicle.

10. The system of claim 9, wherein when the adaptive cruise control module is active to operate the subject vehicle, the adaptive cruise control module presents the operator of the subject vehicle with an option of yielding to the secondary vehicle to allow the secondary vehicle to enter the lane that the subject vehicle is traveling in; and wherein when the operator of the subject vehicle elects to yield to the secondary vehicle, the adaptive cruise control module slows the subject vehicle to maintain a gap between the subject vehicle and the secondary vehicle to allow the secondary vehicle to enter the lane that the subject vehicle is in.

11. The system of claim 1, wherein the message is a basic safety message.

12. A method for avoiding a collision between a subject vehicle and a secondary vehicle comprising:

detecting a location, speed, and heading of the secondary vehicle, and whether the secondary vehicle intends to turn or change lanes with a secondary vehicle detection module based on at least one of inputs from sensors of the subject vehicle or a message transmitted by the secondary vehicle;

warning an operator of the subject vehicle of the secondary vehicle and an identified intention of the secondary vehicle, and modifying a warning intensity with a warning module based on a detected intention of the secondary vehicle to turn or change lanes;

modifying at least one of speed and heading of the subject vehicle with an adaptive cruise control module based on the detected intention of the secondary vehicle to turn or change lanes;

calculating with a control module a time to collision between the subject vehicle and the secondary vehicle based on the location, speed, and heading of the secondary vehicle, and a speed and heading of the subject vehicle;

determining with the control module whether the time to collision between the subject vehicle and the secondary vehicle is greater than or less than a time to collision threshold required to warn the operator of the subject vehicle of the secondary vehicle;

determining with the secondary vehicle detection module that the secondary vehicle intends to turn or change lanes based on detection of an activated turn signal of the secondary vehicle by the sensors, or based on information in the message transmitted by the secondary vehicle;

determining with the control module how much time the secondary vehicle requires to exit a path of the subject vehicle based on the location, speed, and heading of the secondary vehicle, and based on the location, speed, and heading of the subject vehicle; and slowing the subject vehicle with the adaptive cruise control module to accommodate a turn of the secondary vehicle, but maintaining the subject vehicle in motion, when the control module of the subject vehicle detects the following:

the time to collision between the subject vehicle and the secondary vehicle is less than the time to collision threshold required to warn the operator of the subject vehicle of the secondary vehicle; and the time to collision between the subject vehicle and the secondary vehicle is greater than the time required by the secondary vehicle to exit the path of the subject vehicle.

13. The system of claim 12, further comprising slowing the subject vehicle to a stop with the adaptive cruise control module based on a distance between the subject vehicle and the secondary vehicle when the control module of the subject vehicle detects the following:

the time to collision between the subject vehicle and the secondary vehicle is less than the time to collision threshold required to warn the operator of the subject vehicle of the secondary vehicle; and the secondary vehicle detection module detects no turning or lane change motion of the secondary vehicle.

* * * * *

UNITED STATES PATENT AND TRADEMARK OFFICE
CERTIFICATE OF CORRECTION

PATENT NO. : 10,745,007 B2
APPLICATION NO. : 16/003795
DATED : August 18, 2020
INVENTOR(S) : Yu Zhang et al.

Page 1 of 1

It is certified that error appears in the above-identified patent and that said Letters Patent is hereby corrected as shown below:

In the Claims

Column 9, Line 58: In Claim 7, after "system of", insert --claim--

Column 11, Line 17: In Claim 13, delete "system" and insert --method-- therefor

Signed and Sealed this
Twenty-seventh Day of October, 2020

Andrei Iancu
*Director of the United States Patent and Trademark Office*